(No Model.)
J. R. BURDICK.
ELECTRICAL CONDUIT.
No. 342,280. Patented May 18, 1886.
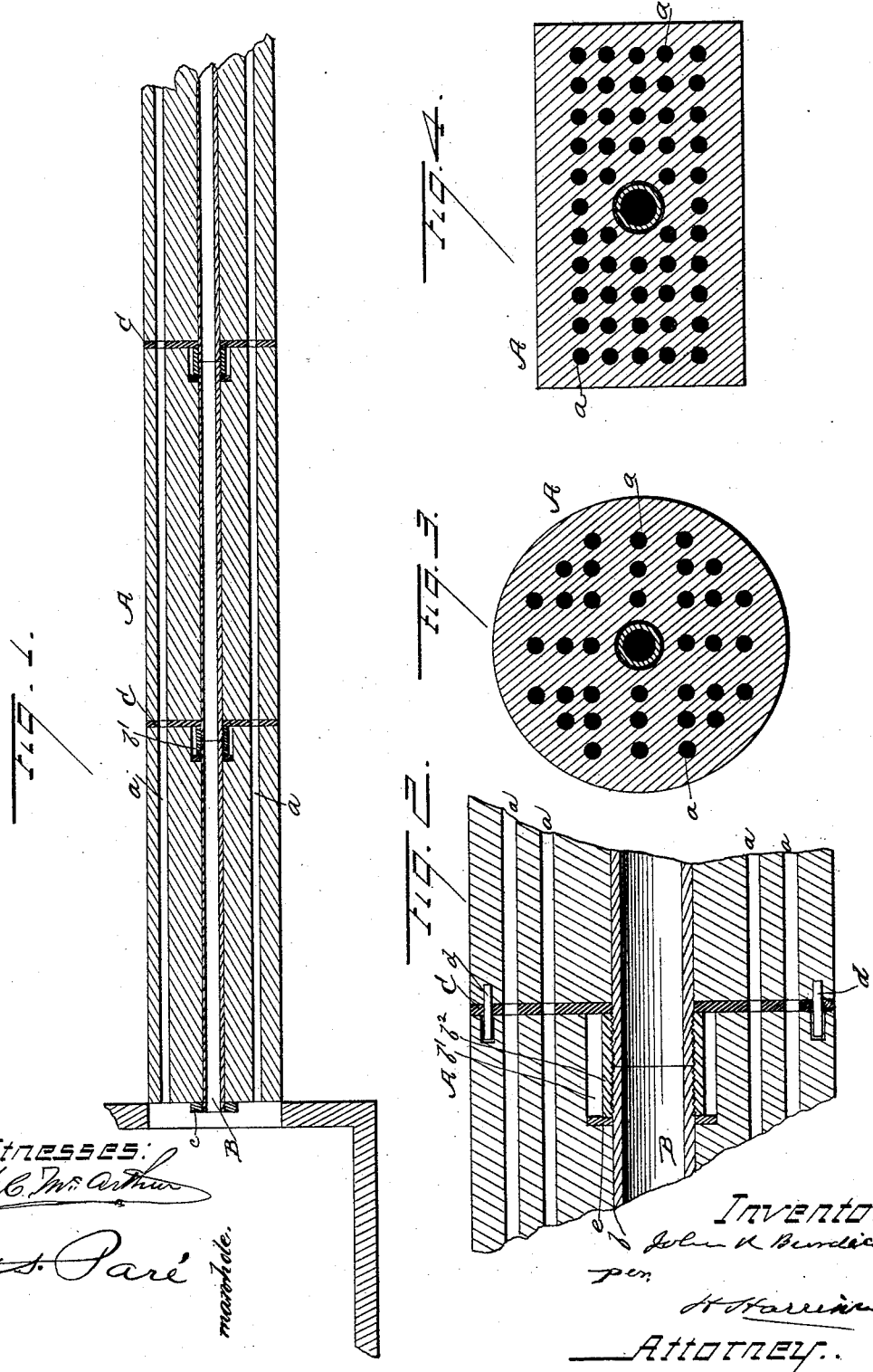

UNITED STATES PATENT OFFICE.

JOHN R. BURDICK, OF CHICAGO, ILLINOIS.

ELECTRICAL CONDUIT.

SPECIFICATION forming part of Letters Patent No. 342,280, dated May 18, 1886.

Application filed August 22, 1885. Serial No. 175,090. (No model.)

*To all whom it may concern:*

Be it known that I, JOHN R. BURDICK, a citizen of the United States, residing at Chicago, in the county of Cook and State of Illinois, have invented certain new and useful Improvements in Electrical Conduits, of which the following is a specification, to wit:

This invention relates to an improvement in electrical conduits; and it consists in certain peculiarities of the construction and operation of the same, substantially as will be hereinafter more fully set forth and claimed.

In order to enable others skilled in the art to which my invention appertains to make and use the same, I will now proceed to describe its construction and operation, referring to the accompanying drawings, in which—

Figure 1 is a sectional view of a conduit such as I shall describe. Fig. 2 is an enlarged section of the joint, and Figs. 3 and 4 are cross-sections of two forms of the same.

A represents a multitubular conduit of a non-conducting composition, such as an asphaltum concrete compound. This conduit is made in sections of suitable length for convenient handling, and provided with as many wire leads or cells, $a$, as desired, or as the size of the section will admit. Through the center of the conduit is formed a passage, $b$, having one end in each section enlarged or recessed, as at $b'$, and through this passage is passed a rod or tube, B, also formed in sections corresponding in length to that of the conduit-sections and joined together by a union, $b^2$, as is commonly done in gas-pipe and tubing of all kinds. Between the adjoining ends of the conduit-sections is placed a plate of non-conducting material, C—such as felt saturated in paraffine—which plate is perforated to correspond with the wire-leads $a$, as indicated in the drawings. The sections are held in proper position and the cells caused to register by means of dowel-pins $d$ in one section, which enter holes in the next section made to receive them.

The conduit is laid as follows: The first section is laid down with the tube or rod B therein, having a nut or cap, $c$, on one end, as in Fig. 1. The non-conducting disk or plate C is then placed in position, the next section laid in place and properly registered by means of its dowel-pins, and the rod or tube in this section screwed upon the first, thus drawing the sections together upon the packing-sheet, and quickly securing them against displacement. The union $b^2$ is entirely received within the recessed end of the conduit-section, and is tightened against a washer, $e$, upon the tube, as in Fig. 2.

The primary object of the rod or tube B being to easily and rapidly secure the sections together in laying, it will be of no consequence whether it be solid or hollow; but when made hollow it may be utilized for the reception of an insulated wire or cable, and thereby economize space in the conduit.

While any sheet of soft non-conducting material may be used in the joint, I find that felt saturated with paraffine is very good and serves the purpose desired.

Having thus fully described my invention, what I claim as new, and desire to secure by Letters Patent, is—

1. A multitubular conduit formed in sections, having a central passage enlarged or recessed at one end, in combination with a tie-rod, also made in sections, united by a shouldered screw-joint within the recessed ends of the conduit-sections, substantially as and for the purpose set forth.

2. A multitubular conduit formed in sections, having a central passage enlarged or recessed at one end, in combination with a sectional metal pipe passed through this central passage and united by a shouldered screw-joint within its recessed ends, whereby the sections are held together and an additional passage for wires secured, substantially as and for the purpose set forth.

3. A multitubular conduit formed in sections secured together by a tie rod or tube through its longitudinal center, in combination with a sheet or plate of non-conducting material placed between the ends of the sections and perforated to correspond with the wire-leads, substantially as shown and described.

4. The conduit A, formed of multitubular sections, having a central passage, $b$, formed with an enlargement, $b'$, at one end, and provided with the dowel-pins $d$, in combination with the hollow tie rod or tube B, having the union $b^2$ and washer $e$, and the non-conducting disk C, perforated to correspond with the wire-leads, substantially as and for the purpose herein specified.

In testimony whereof I affix my signature in presence of two witnesses.

JOHN R. BURDICK.

Witnesses:
W. C. McARTHUR,
A. S. PARÉ.